B. J. CARTER.
ADJUSTABLE JOURNAL BEARING.
APPLICATION FILED SEPT. 4, 1906.
962,124.
Patented June 21, 1910.
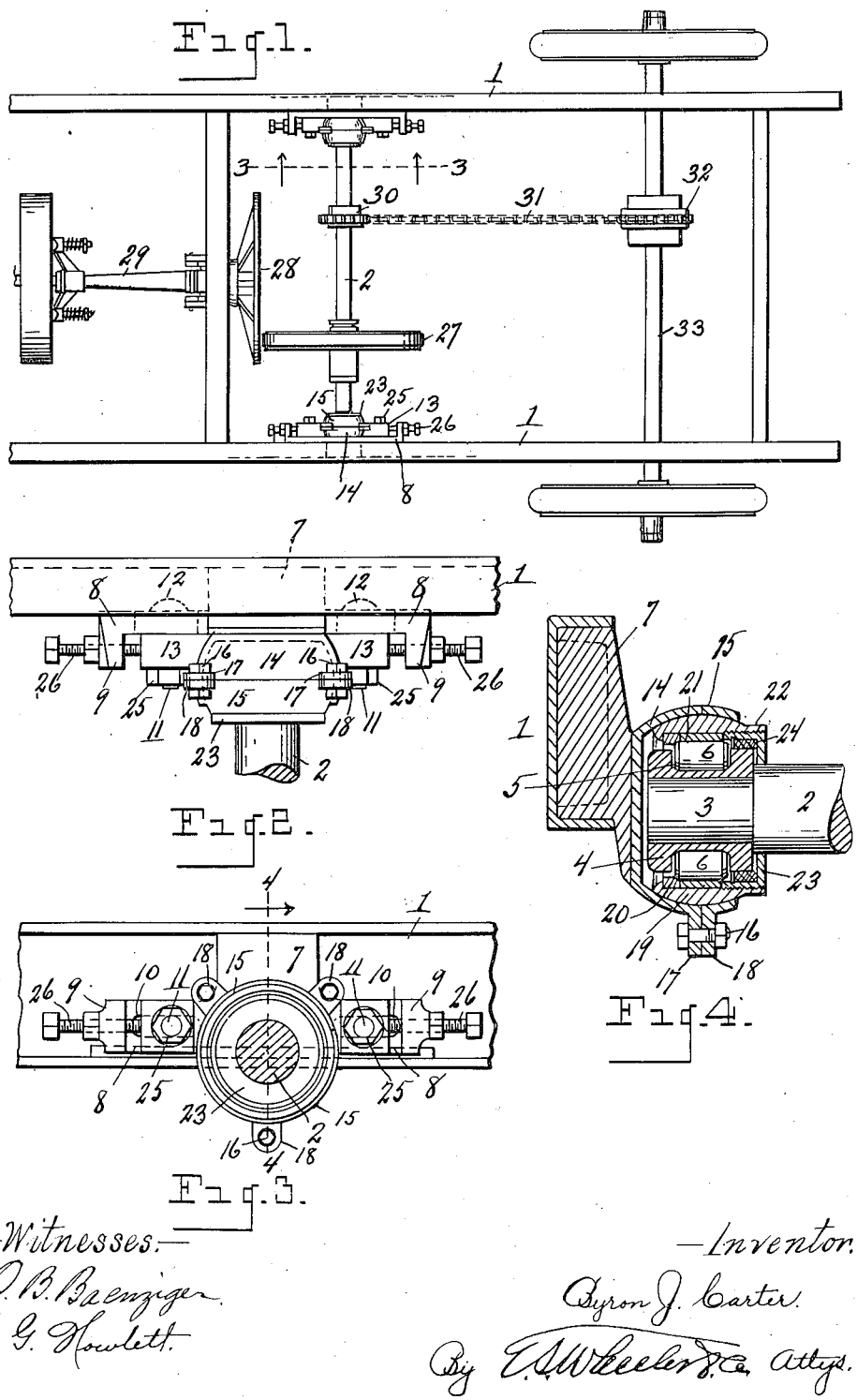

UNITED STATES PATENT OFFICE.

BYRON J. CARTER, OF DETROIT, MICHIGAN, ASSIGNOR TO MOTOR CAR CO., OF DETROIT, MICHIGAN, A CORPORATION OF MICHIGAN.

ADJUSTABLE JOURNAL-BEARING.

962,124.            Specification of Letters Patent.     Patented June 21, 1910.

Application filed September 4, 1906. Serial No. 333,235.

*To all whom it may concern:*

Be it known that I, BYRON J. CARTER, a citizen of the United States, residing at Detroit, in the county of Wayne, State of Michigan, have invented certain new and useful Improvements in Adjustable Journal-Bearings; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a self-adjustable shaft bearing, especially designed for supporting the opposite ends of a transverse shaft mounted in the frame of a motor vehicle, and consists in the construction and arrangement of parts hereinafter fully set forth and pointed out particularly in the claims.

The object of the invention is to provide simple and efficient means for maintaining the bearing members always parallel with the axis of the shaft, obviating the binding of the journals of the shaft should the frame supporting the bearing parts become sprung or twisted so as to force the bars thereof out of parallel relation.

The above object is attained by the structure illustrated in the accompanying drawings, in which:—

Figure 1 is a plan view of a portion of a motor vehicle frame between the side bars of which is journaled a transverse shaft in accordance with my invention, a friction transmission device being employed in connection with said shaft that the application of the invention may be more perfectly understood. Fig. 2 is an enlarged plan view of the shaft and bearing at one end, other parts being broken away. Fig. 3 is a transverse section through the shaft as on line 3—3 of Fig. 1. Fig. 4 is a vertical section as on line 4—4 of Fig. 3, the shaft appearing in elevation.

Referring to the characters of reference, 1 designates the side bars of a motor vehicle frame which are of the ordinary channel iron structure, as shown in Fig. 4. Crossing between the side bars of said frame is a transverse shaft 2. Each end of said shaft is provided with a reduced portion 3 onto which is fitted a steel bearing block 4 which becomes the journal of the shaft and which is provided with a central channel 5 that serves as a race way for the bearing rollers. Lying in said channel of the journal are the rollers 6 which support the end of the shaft.

Secured in any suitable manner to the side bars of the frame in transverse alinement are the brackets 7 having the laterally projecting arms 8 extending in opposite directions provided with the right angle end portions 9. Formed through the arms 8 are the horizontal slots 10 through which pass the bolts 11, the heads 12 of said bolts engaging the rear sides of said arms. Mounted upon the outer face of the arms 8 is a slidable block 13 having at the central portion thereof an annular shell 14 concavo-convex in cross section, which forms a part of the case for the bearing, the complementary portion of said case being formed by the concavo-convex ring 15 which is secured against the outer edge of the shell by means of the transverse bolts 16 which pass through the ears 17 on said shell and through the registering ears 18 on said ring, said shell and ring forming a bearing socket of globular formation. By dividing said shell in the manner described, provision is made for inserting the bearing parts therein.

Lying within the bearing shell or socket is an annular bearing member 19 having a convexed or rounded outer wall concentric with the wall of said socket so as to permit of a tilting movement of said bearing member within the socket in any direction concentric with the curved wall thereof, on the plan of a ball and socket joint. Lying within the annular bearing member is a thrust ring 20 that engages the inner ends of the rollers 6; also confined within said bearing member is a steel bearing ring 21 upon which said rollers are adapted to roll. The outwardly projecting flange 22 of the bearing member 19 is internally threaded and screwing into the end of said bearing member is a dust cap 23 which abuts against the outer edge of the bearing ring 21 to retain it in place. Confined between the dust cap and the journal 4 is a dust excluding washer 24.

The bolts 11 pass through the opposite ends of the slidable block 13 and receive the nuts 25. Threaded in and passing through the right angle end portions 9 of the arms 8 are the adjusting screws 26 which bear against the opposite ends of the block 13.

By loosening the nuts 25 and manipulating the screws 26, the block 13 may be adjusted longitudinally to place the opposite ends of the bearings of the axle in transverse alinement; said movement of the block 13 being provided for by means of the slots 10 in the arms 8 through which the bolts 11 pass.

It will now be understood that should the opposed bars 2 of the frame be forced out of horizontal alinement, the bearing members 19 will tilt within the globular bearing sockets to accommodate said change in the position of said bars and maintain the bearing rollers always parallel with the axis of the shaft, obviating the springing of the shaft and preventing friction incident to a cramped bearing. In like manner should the frame become racked, the bearing members will so adjust themselves as to prevent straining the shaft and causing undue friction in the bearings.

Upon the shaft 2 is a friction wheel 27 splined thereon and movable across the face of a power transmitting friction disk 28 which is connected with the shaft 29 of the motor, not shown. Passing over a sprocket wheel 30 on the shaft 2 is a chain 31 which drives the differential gear 32 on the rear axle 33 of the vehicle. Because of the fact that the wheel 27 must move across the face of the disk 28, it is necessary to provide for a perfect adjustment of the end bearings of the shaft 2 so that said shaft may be made to stand exactly parallel with the face of said disk, which adjustment is accomplished by the arrangement of parts herein described.

Having thus fully set forth my invention, what I claim as new and desire to secure by Letters Patent, is:—

1. The combination with the fixed parallel supports, of globular bearing cases mounted on said supports, means for adjusting said bearing cases laterally, a shaft having journals on its opposite ends, said journals lying in said cases, spherical bearing members rotatable within the cases and embracing said journals, bearing rollers interposed between the journals and bearing members, the bearing cases having removable inner sections to permit of the introduction of the spherical bearing members.

2. The combination with the side bars of a frame, of brackets secured thereto, slidable bearing blocks adjustably mounted on said brackets, said bearing blocks having globular bearing shells, a spherical bearing member in each of said bearing shells, a transverse shaft having journals at each end thereof, said journals lying in said bearing members respectively, and bearing rollers interposed between said bearing members and said journals.

3. The combination of a globular bearing case formed of separable parts, a spherical bearing member rotatable in said case having an aperture therein, a journal within the bearing member, bearing rollers interposed between the bearing member and journal and a dust cap fitted into the bearing member and embracing the shaft of the journal.

In testimony whereof, I sign this specification in the presence of two witnesses.

BYRON J. CARTER.

Witnesses:
E. S. WHEELER,
I. G. HOWLETT.